(12) United States Patent
Kuisma (10) Patent No.: US 9,453,775 B2
(45) Date of Patent: Sep. 27, 2016

(54) PRESSURE SENSOR (71) Applicant: MURATA MANUFACTURING CO., LTD., Nagaokakyo-shi, Kyoto (JP)

(72) Inventor: Heikki Kuisma, Helsinki (FI)

(73) Assignee: MURATA MANUFACTURING CO., LTD., Nagaokakyo-shi, Kyoto (JP)

( * ) Notice: Subject to any disclaimer, the term of this patent is extended or adjusted under 35 U.S.C. 154(b) by 242 days.

(21) Appl. No.: 14/286,117

(22) Filed: May 23, 2014

(65) Prior Publication Data
US 2014/0352445 A1    Dec. 4, 2014

(30) Foreign Application Priority Data

May 28, 2013  (FI) ..................................... 20135573

(51) Int. Cl.
G01L 7/08     (2006.01)
G01L 9/00     (2006.01)

(52) U.S. Cl.
CPC ........... *G01L 9/0072* (2013.01); *G01L 9/0047* (2013.01)

(58) Field of Classification Search
None
See application file for complete search history.

(56) References Cited

U.S. PATENT DOCUMENTS 7,307,775 B2 * 12/2007 Patel ..................... B81B 7/0077
                                                359/290
2004/0112529 A1 * 6/2004 Karlsson ............. B01J 19/0093
                                                156/306.6
2005/0076719 A1    4/2005 Jakobsen et al.
2006/0063293 A1    3/2006 Benzel et al.
2011/0146411 A1    6/2011 Doering et al.
2011/0154905 A1    6/2011 Hsu et al.
2012/0073379 A1    3/2012 Ahles et al.
2012/0297884 A1   11/2012 Gamage et al.
2014/0332910 A1 * 11/2014 Kuisma ................ B81B 7/0048
                                                257/416
2014/0352446 A1 * 12/2014 Kuisma ..................... G01L 9/12
                                                73/724
2015/0204744 A1 *  7/2015 Kuisma ................ G01L 9/0072
                                                73/718

FOREIGN PATENT DOCUMENTS

EP         2 058 639 A2     5/2009
WO     WO 2012/059266 A1    5/2012

OTHER PUBLICATIONS

Ville Kaajakari, "Practical MEMS", 2009, p. 204.
International Search Report international application No. PCT/IB2014/061747 mailed Aug. 12, 2014.

(Continued)

*Primary Examiner* — Andre Allen
(74) *Attorney, Agent, or Firm* — Squire Patton Boggs (US) LLP (57) ABSTRACT

A microelectromechanical pressure sensor structure comprises a planar base, side walls and a diaphragm plate, attached to each other to form a hermetically closed gap that provides a reference pressure. The diaphragm plate extends along a planar inner surface on top of the side walls, and has an outer surface on the opposite side of the diaphragm plate. At least part of the outer surface of the diaphragm plate forms a planar part that includes a recess, a depth of which extends parallel to the side walls and is less than the nominal thickness of the diaphragm. A large part of reasons causing the different bending of the diaphragm and the underlying structures can be eliminated with one or more recesses arranged to the pressure sensor structure.

17 Claims, 8 Drawing Sheets

(56) References Cited

OTHER PUBLICATIONS

Finnish Search Report dated Mar. 18, 2014 corresponding to Finnish Patent Application No. 20135573.

A.V. Chavan et al., "Batch-Processed Vacuum-Sealed Capacitive Pressure Sensors," Journal of Microelectromechanical Systems, vol. 10, No. 4, pp. 580-588, Dec. 2001.

* cited by examiner

PRIOR ART

PRESSURE SENSOR

FIELD OF THE INVENTION

The present invention relates to microelectromechanical devices and especially to an improved pressure sensor structure and a pressure sensor device according to preambles of the independent claims.

BACKGROUND OF THE INVENTION

Pressure is a physical quantity that corresponds to the ratio of force acting on a surface to the area of the surface. A device that can be used as a gauge to measure the pressure is a pressure sensor.

Atmospheric pressure is the pressure exerted at the surface by a column of air in an atmosphere. The atmospheric pressure varies with altitude and weather patterns. The quantity obtained with a pressure sensor may exclude the ambient atmospheric pressure and in this case indicates overpressure or relative pressure. If atmospheric pressure is included, the result indicates absolute pressure. The pressure sensor may also be arranged to measure the pressure difference between two ambients in which case the measured quantity is called differential pressure.

Micro-Electro-Mechanical Systems, or MEMS can be defined as miniaturized mechanical and electro-mechanical systems where at least some elements have a mechanical functionality. Since MEMS devices are created with the same tools used to create integrated circuits, micromachines and microelectronic elements can be fabricated on a piece of silicon to enable various types of devices.

Figure 1:
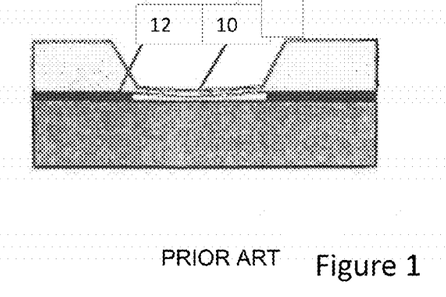
FIG. 1 illustrates a prior art pressure sensor structure.

FIG. 1 illustrates an exemplary structure of a microelectromechanical device for sensing of pressure, shown in page 204 of "Practical MEMS" by Ville Kaajakari. Microelectromechanical pressure sensors typically comprise a thin diaphragm 10 that is spanned over a gap in an insulator layer 12. The gap forms a volume for a reference pressure, and the diaphragm deforms due to a difference between the reference pressure and an ambient pressure surrounding the sensor. The diaphragm displacement may be translated to an electrical signal with capacitive or piezoresistive sensing.

Conventionally, the diaphragm 10 is formed of a thinned area made by etching into a silicon wafer, as shown in FIG. 1. The diaphragm 10 is a very thin foil, so the etched recess is almost as deep as the whole silicon wafer. Lately, the desire in the field has been to produce remarkably thinner pressure sensor structures. It has been noted, however, that reduction of thickness of the structure imposes many challenges to the design. In a microelectromechanical pressure sensor, the detected diaphragm displacement due to pressure change can be nanometers or less, and also signals generated by the diaphragm displacements are very small. Already change of dimensions of the sensor structure elements caused by thermal expansion in varying operating temperatures can cause significant variations to the generated measurement signals. In addition, the sensor structure and the associated electronics need to be capsulated in a package. The package may have different thermal expansion coefficient than the sensor structure, which may cause large, temperature dependent bending stresses that distort the measurements.

BRIEF DESCRIPTION OF THE INVENTION

The object of the present invention is to facilitate provision of thinner microelectromechanical pressure sensor structures where adverse effects of structural bending are eliminated or at least efficiently alleviated. The objective of the present invention is achieved with a pressure sensor structure and a pressure sensor according to the characterizing portions of the independent claims.

The preferred embodiments of the invention are disclosed in the dependent claims.

The claimed invention defines a microelectromechanical pressure sensor structure that comprises a planar base, side walls and a diaphragm plate. The side walls extend circumferentially to a first distance away from the planar base. The diaphragm plate extends along a planar inner surface on top of the side walls, and has an outer surface opposite the inner surface on the diaphragm plate. The planar base, the side walls and the diaphragm plate may be attached to each other to form a hermetically closed gap in a reference pressure. A top edge of inner surfaces of the side walls forms a periphery of a diaphragm, a nominal thickness of the diaphragm equals to the distance from the inner surface to the outer surface of the diaphragm plate at the periphery of the diaphragm. The outer surface of the diaphragm plate includes a planar surface part that includes a periphery of a recess, a depth of which extends parallel to the side walls and is less than the nominal thickness of the diaphragm.

In the invention, it is accepted that bending of the pressure sensor structures by external forces other than the applied pressure cannot be fully avoided. Such external forces may be, for example, due to internal thermal expansion differences of the sensor materials or due to the packaging of the pressure sensor. There are various reasons that cause the diaphragm to bend differently than the underlying planar base, and the error caused by this difference may be significant to the measurements. It has been detected that to a large extent the effects caused by the different bending shapes within the structure can be eliminated by means of one or more recesses that are arranged to a diaphragm plate that provides the diaphragm and anchoring structures around its periphery. The recess or recesses act locally on the diaphragm and efficiently compensate for various effects that cause said differences. Significantly more accurate results are achieved.

Features and advantages of the claimed invention and its embodiments are described in more detail with the detailed description of the embodiments.

BRIEF DESCRIPTION OF THE FIGURES

In the following the invention will be described in greater detail, in connection with preferred embodiments, with reference to the attached drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various implementations of pressure sensor structures and pressure sensor devices comprise elements that are generally known to a person skilled in the art and may not be specifically described herein.

Figure 2:
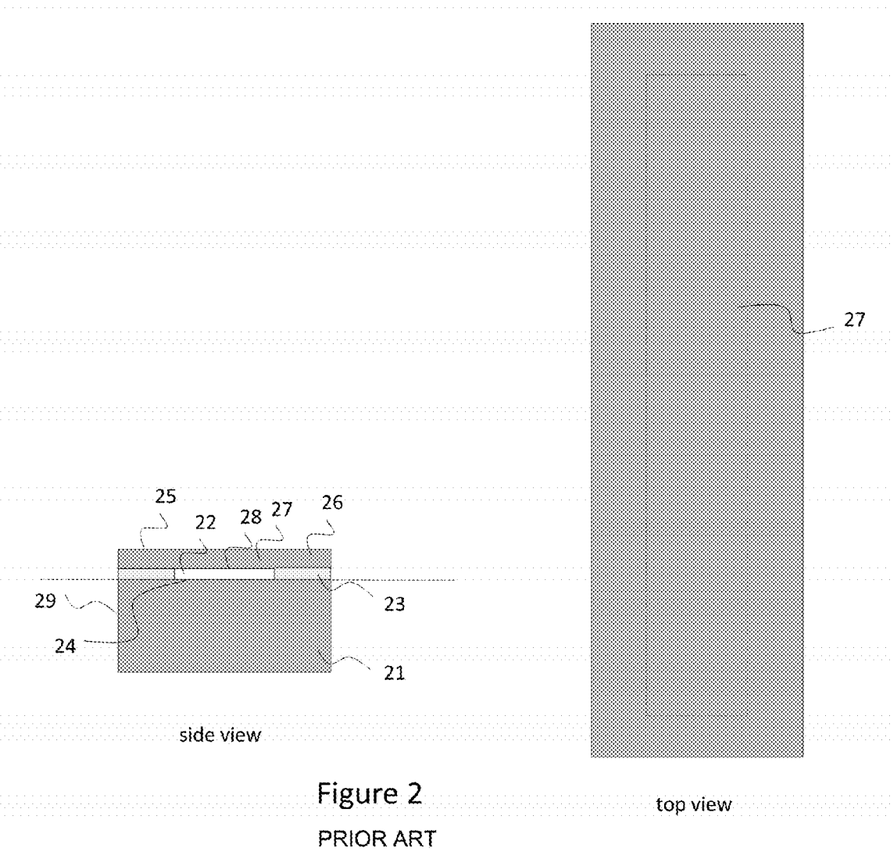
FIG. 2 illustrates elements in an exemplary structure of a microelectromechanical device for sensing of pressure.

As an embodiment of the present invention, FIG. 2 illustrates an exemplary structure of a microelectromechanical pressure sensor. FIG. 2 shows a side view and a top view of the illustrated sensor structure. The illustrated pressure sensor structure comprises a body structure formed by a planar base 21 and side walls 23. The planar base 21 may be manufactured from a wafer of silicon material, for example, but other conductor, semiconductor or insulator materials may be applied within the scope of protection. The planar base 21 may also consist of layers of material. As an example, a layer on the surface of the planar base may be electrically conductive to act as an electrode of a capacitive sensor. As another example, the entire planar base may have high enough conductivity to act as an electrode. The planar base 21 has a first surface 24 that extends essentially along a plane of the planar base 21. The term essentially means here that the first surface may accommodate minor surface structures (bumps or cavities), but over 90% of the surface area is, within tolerances, aligned to the plane of the planar base 21.

The side walls 23 extend away from the first surface 24. In FIG. 2 the side walls extend to a direction that is perpendicular to the first surface 24, as shown in FIG. 2. However, sides of the side walls may also form an acute or an obtuse angle with the first surface. The side walls 23 are rigidly attached to the planar base 21 and thus circumscribe an open space onto it. Together with the planar base 21, the side walls 23 form a hollow, the depth of which corresponds with the height of the side walls 23. The side walls may be of electrically insulating material, like silicon dioxide, but other electrically insulating materials may be applied within the scope of protection. Alternatively, the side walls may be of electrically conductive material, if the diaphragm plate and the planar base are made of insulating material. In the top view of the example structure, a cross section of the side walls shows as a rectangular perimeter that extends outwards from the dotted line. The dotted line denotes the inner surfaces of the side walls, and top edge of these inner surfaces defines a circumferential opening to the hollow formed by the planar base 21 and the side walls 23.

A microelectromechanical pressure sensor is based on a thin diaphragm that has two sides and deflects according to a pressure difference between them. An absolute pressure sensor typically incorporates a gap that is hermetically closed from the ambient environment. In a differential pressure sensor, the diaphragm is exposed to two separate pressures. If the other pressure is the atmospheric pressure, the differential pressure sensor may be called an overpressure sensor. If the other pressure is another known reference pressure, the differential pressure sensor may be called a relational sensor. The invention may be applied to any type of absolute or differential pressure sensor structures that include the claimed configuration.

The exemplary pressure sensor structure of FIG. 2 is an absolute pressure sensor, in which the hollow is hermetically sealed by a diaphragm plate 26 that extends on the side walls 23. The term diaphragm refers here to a film of elastically deforming material that is anchored at its periphery. The diaphragm plate 26 is a planar object that provides to the sensor structure a diaphragm 27 and anchors the diaphragm 27 at its periphery. The diaphragm plate 26 has a planar inner surface 28 and an outer surface 25 that is not necessarily uniformly planar, but has one or more planar regions that form a planar part of the outer surface.

The diaphragm plate 26 may be made of one or more material layers. If the diaphragm plate comprises more than one layer, a bottom layer is on the side of the gap and the top layer is on the other side of the diaphragm plate, opposite to the bottom layer. Silicon material is often used at least in one layer, but other conductor, semiconductor or insulator materials may be applied within the scope of protection. The diaphragm plate 26 connects to the side walls 23 through its inner surface, a second surface 28 that is a plane initially parallel to the first surface 24 of the planar base 21. It is noted that the term initially relates here to the dimensions of the elements in the manufacturing stages of the sensor. A person skilled in the art understands that during operation of the pressure sensor, parts may deform out of their initial planar form. If the diaphragm plate comprises more than one layer, the second surface is on the bottom layer of the diaphragm plate.

A third surface 25 is a reference plane formed by the one or more planar regions that form a planar surface part of the outer surface. The third surface is thus formed of a surface or surfaces of the top layer that are furthermost from the second surface on the diaphragm plate 26.

The planar base 21, the side walls 23 and the diaphragm plate 26 are attached to each other such that the first surface 24, the second surface 28 and inner surfaces of the side walls 23 form a hermetically closed gap 22 that provides a reference pressure. The gap 22 may be evacuated to contain only small amounts of residual gases, but it can also be filled with a selected gas or other volatile material at a selected reference pressure. As understood by a person skilled in the art, the configuration may be arranged to an overpressure sensor, a relative pressure sensor or a differential pressure sensor by, for example, opening a passage for a pressure medium (liquid or gas) in a second pressure to enter the gap between the diaphragm and the planar base A part of the diaphragm plate 26 that extends over the circumferential opening to the gap 22 provides a diaphragm 27 whose periphery is defined by the opening, and anchoring is provided by a firm material contact between the top surface of the side walls and the diaphragm plate. A nominal thickness of the diaphragm equals to the distance between the second surface and the outer surface of the diaphragm plate at the periphery of the diaphragm. The diaphragm 27 is exposed on one side to the reference pressure of the gap and on the other side to the ambient pressure on top of the diaphragm plate 26. This diaphragm 27 thus deforms in response to a pressure difference between the reference pressure and the ambient pressure. The extent of this deformation may be detected capacitively by translating with electrodes the deformation-induced change in the height of the gap 22 into an electric signal. The deformation may be detected alternatively with a piezoresistive or similar strain-gauge based method by translating deformation-induced stress in the diaphragm into an electrical signal with incorporated piezoresistors or strain-gauge resistors. All of these methods are disclosed in the art and as such well known to a person skilled in the art will not be discussed in more detail in this text. The solution is specifically applicable for pressure sensor structures where capacitive sensing is applied.

Figure 3:
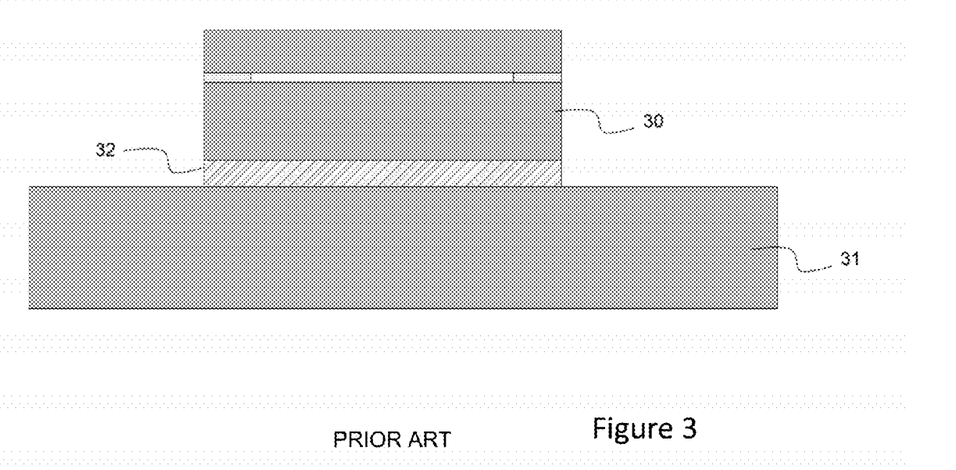
FIG. 3 illustrates a typical microelectromechanical packaging solution.
Figure 4:
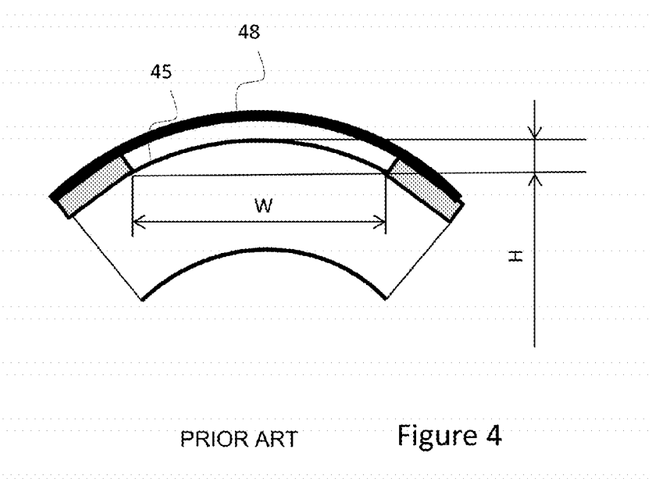
FIG. 4 illustrates a curved shape of a bent pressure sensor structure.

FIG. 3 illustrates a typical MEMS packaging solution where the sensor structure 30 of FIG. 2 is attached to a carrier substrate 31 by means of an adhesive layer 32. As known in the art, different thermal expansion coefficients of material layers tend to result in bending stresses. In a packaged device, a mismatch between thermal expansion coefficients of the pressure sensor and the package may bend the sensor structure to a curved shape, as shown in FIG. 4. This curved shape may be approximated with a spherical cap, where the width of the base of the cap is W and the height of the cap is H.

Figure 5:
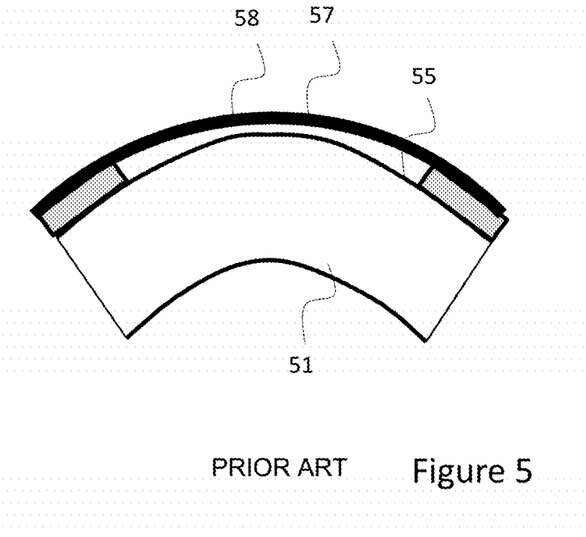
FIG. 5 illustrates differently curved surfaces in a bent pressure sensor structure.

In capacitive detection, the diaphragm deflection is sensed by detecting changes in capacitance over the gap between a deflecting diaphragm electrode on the first surface 45 and a fixed electrode on the second surface 48. Ideally, the detected capacitance would change only due to the deflection in response to detected pressure changes. Even bending of the diaphragm and the fixed electrode by external forces can be tolerated; this would ideally not disturb the detection, if the first surface 45 in the bottom of the gap and the second surface 48 in the top of the gap would bend similarly, i.e. such that the height of the gap would not change because of the bending. However, there are several practical factors that cause the surfaces to deform differently, as shown in FIG. 5.

For example, a wafer of the planar base 51 may bend to a spherical surface if it is subject to uniform bending moment, and if its lateral dimension is very large compared to its thickness. The latter requirement is not easily fulfilled due to limited size of the sensor compared to its thickness. This means that the bending moment tends to be relaxed close to the edges of the wafer by shear deformation. Because of this, the wafer thus tends to bend into a shape that in not spherical but reminds more an obtuse conical form, as shown in FIG. 5. On the other hand, the diaphragm is supported at the edges by the side walls that tend to bend to a constant angle by bending of the wafer, and the diaphragm is free to bend to a natural shape, the diaphragm typically tends to bend into a parabolic shape. The result is that the distance between the first surface 55 and the second surface 58 will change not only because of the deflection, but also because of the different bending. This will cause an error to the measured capacitance values.

A further effect that makes the bending of the elements to deviate from ideal similarity is the bending moments that are generated at the edges of the diaphragm due to asymmetric support by the side walls when any tensile or compressive in-plane stress is present at the mid-plane of the diaphragm. As will be discussed later, there are also other mechanisms that may contribute to the error through different bending of the structures.

Referring back to FIG. 4, in an ideal case the planar base is bent to a spherical surface by a constant bending moment and the diaphragm is bent to a parabolic surface so that the slopes of the surfaces are equal at the attachment point. In such a case the two surfaces have almost identical shapes as depicted in FIG. 4.

Figure 6:
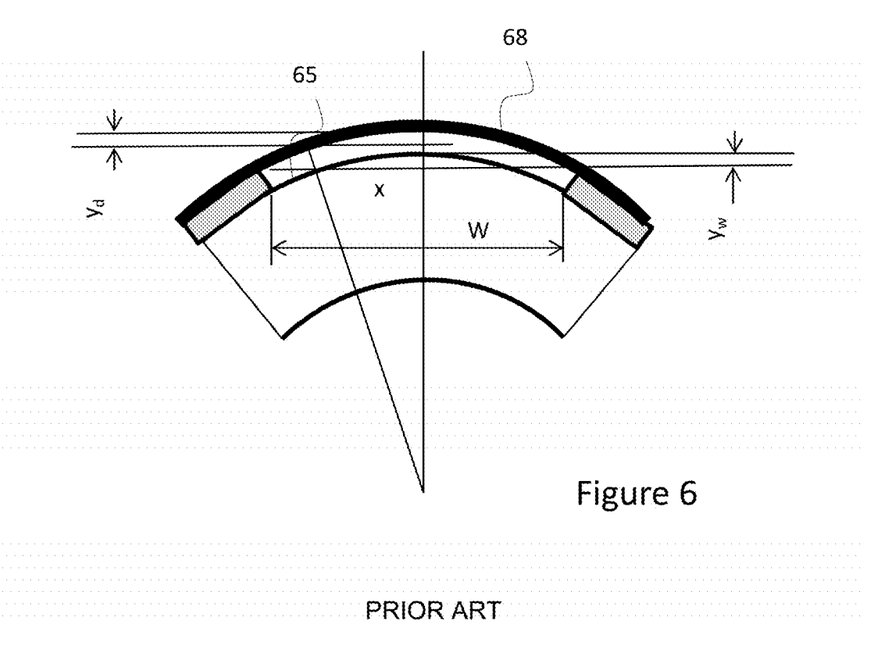
FIG. 6 illustrates applied variable in the bent pressure sensor structure.

FIG. 6 illustrates segments of the first surface and the second surface in a lateral position x between $-W/2$ and $W/2$. If the width of the segment is W and the height is H, the radius R of a curvature of the segment may be expressed as $$R = \frac{\left(\frac{W}{2}\right)^2 + H^2}{2H} \quad (1)$$

In a lateral position x as shown in FIG. 6, the first surface 65 of the planar base wafer follows a circular law $$y_w = \sqrt{R^2 - x^2} - R + H \quad (2)$$

where $y_w$ represents height of a segment in the lateral position x between $-W/2$ and $W/2$.

Similarly, the second surface 68 of the diaphragm follows a parabolic law $$y_d = \frac{1}{2} \frac{\left(\frac{W}{2}\right)^2 - x^2}{\sqrt{R^2 - \left(\frac{W}{2}\right)^2}} \quad (3)$$

Figure 7:
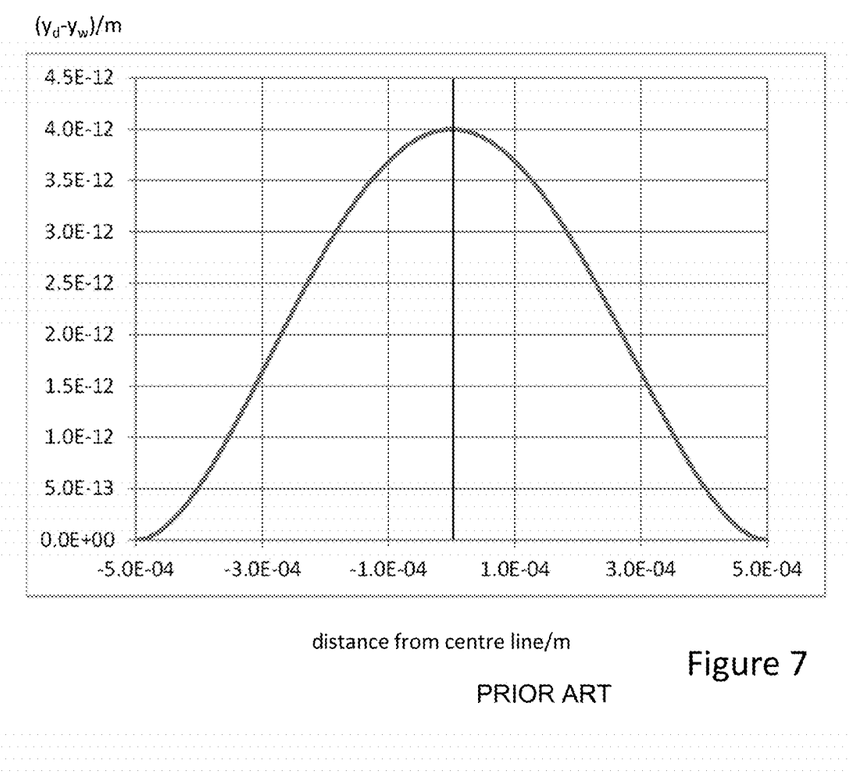
FIG. 7 illustrates distribution of difference in bending of the structures over the width of an exemplary diaphragm.

In some practical cases $y_d(x)$ and $y_w(x)$ can be considered equal. For example, if the width of a diaphragm is W=1 mm, and the height H=1 μm (R=0.125 m) the maximum difference $y_d - y_w$ is only 4 pm. FIG. 7 illustrates distribution of this difference over the width of this exemplary diaphragm. It is seen, however, that the diaphragm tends to bend slightly more than the planar base wafer.

As discussed above, the importance of keeping the bending of the two surfaces equal is based on the fact that the capacitance of the sensor depends on the difference of the distance between the two surfaces. At zero pressure, i.e. when the ambient pressure equals the reference pressure within the gap, two main factors have an effect to the distance: a constant spacing that is equal to the height of the side walls, and a difference between the bending curvatures of the two surfaces. As shown in FIG. 6, the latter changes the distance as a function of location from the anchored edges of the diaphragm. At other (non-zero) pressures, the deflection of the diaphragm due to the applied pressure has also to be taken into account. At zero pressure the capacitance of the sensor can be calculated from an equation $$C = \varepsilon_0 \int\int \frac{dx\,dy}{g - \Delta H(x, y)} = C_S\left(1 + \frac{\Delta H_{ave}}{g}\right) \quad (4)$$

where g represents a dielectric spacing distance of the gap (height of the insulating side walls), $\Delta H(x,y)$ represents the difference $(y_d - y_w)$ between bending of the diaphragm and bending of the wafer as a function of the lateral position x and y, $C_S$ represents the capacitance over the diaphragm area without bending and $\Delta H_{ave}$ represents the average of the difference of the bendings $\Delta H(x,y)$ over the extent the diaphragm. The latter part of the equation is an approximation that can be written if $|H(x,y)| \ll g$ at all points of the diaphragm. From equation (4) one can see that bending of the sensor structure has no error effect on the capacitance if $\Delta H_{ave}$ can be made equal or close to zero. Embodiments of this invention include sensor structures by means of which this condition is achieved.

In embodiments of the present invention, the diaphragm plate may be made thinner than in conventional pressure sensor structures. In the embodiments, the thickness of the diaphragm plate corresponds to a distance from the second surface on the diaphragm plate to the third surface on the diaphragm plate. In order to compensate effects of bending of the structures, the average $\Delta H_{ave}$ of the difference of the bendings $\Delta H(x,y)$ between the first surface and the second surface over the extent of the diaphragm is minimized by means of specific local variations that are made to the thickness of the diaphragm plate.

A bending moment exists in a structural element when a moment is applied to the element so that the element bends. When the sensor structure bends, a bending moment is experienced in the second surface. If the part of the diaphragm plate over the periphery of the diaphragm is thin so that the applied pressure can cause a significant deflection, the bending moment can also cause a significant additional bending to the diaphragm and/or the diaphragm plate, and thereby disrupt the accuracy of the measured values.

Figure 8:
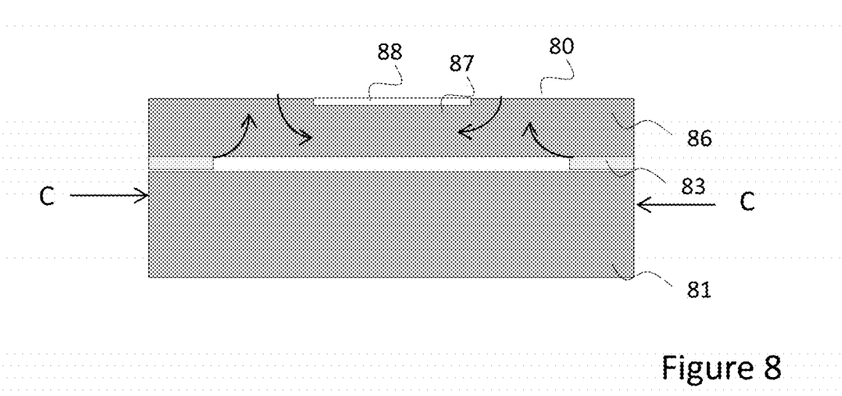
FIG. 8 illustrates an embodiment where a recess is in an outer surface of a diaphragm plate.

In an embodiment of the invention, the diaphragm plate is made to include a local thickness variation that creates a counter-bending moment that is responsive to the applied bending moment and thus controllably compensates its effect. FIG. 8 illustrates an embodiment where the local variation is a recess in the third surface on the diaphragm plate. FIG. 8 is a side view that shows the sensor structure from its width direction, and shows the planar base 81, the side walls 83 and the diaphragm plate 86 elements described in more detail above with FIG. 2. In this embodiment, the diaphragm plate is a monolayer structure whose top plane constitutes an outer surface of the diaphragm plate, and also the third surface 80 of the diaphragm plate 86. The nominal thickness of the diaphragm equals to the distance from the second surface to the outer surface of the diaphragm plate at the periphery of the diaphragm, and thus equals here the thickness of the diaphragm plate. This third surface 80 includes a periphery of at least one recess 88, a depth of which extends in the direction of the side walls. The depth of the recess 88 is less than the nominal thickness of the diaphragm. A top edge of the inner surfaces of the side walls 83 forms a periphery of the diaphragm 77 that may have any shape. However, for easier design, a rotationally symmetrical (circle, square), or an oblong shape is preferred. The recess may be positioned on the third surface such that the center point of the recess coincides with the center point or center line of the diaphragm 87.

FIG. 8 illustrates effect of the recess with a case of in-plane compressive force C that acts as the wafer of the planar base. The in-plane force is illustrated with straight arrows in FIG. 8. The lower curved arrows illustrate a bending moment generated at the periphery of the diaphragm because of the asymmetrical support by the insulating layer forming the side walls. The upper curved arrows illustrate the counter-bending moment that occurs at the edges of the recess. As may be seen, the counter-bending moment at the edges of the recess follows the bending moment at the edges of the diaphragm, and has an opposite sign.

According to equation (4) the object is to minimize the average $\Delta H_{ave}$ of the difference of the bendings $\Delta H(x,y)$ over the extent the diaphragm. This condition could be achieved with a variety of combinations of shapes of the diaphragm and the recess, so also different shapes for the diaphragm and the recess are within the scope. However, when the periphery of the diaphragm has the same shape as the periphery of the recess, differences of the bendings are relatively simple functions of position, and the average $\Delta H_{ave}$ over the extent of the diaphragm is less sensitive to manufacturing variations than with a more complex shape. Thus, the periphery of the diaphragm and the periphery of the recess are preferably of the same shape.

Figure 9A:
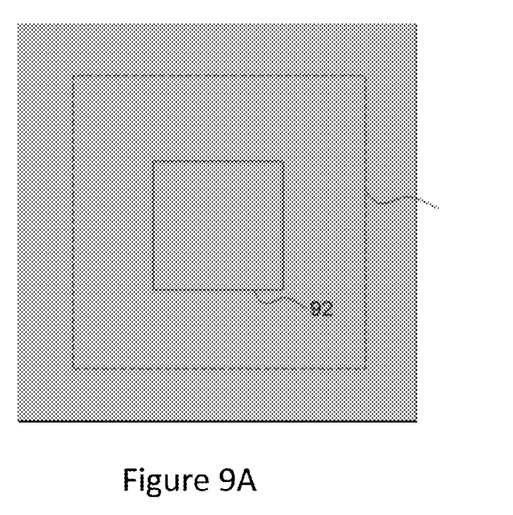
FIGS. 9A to 9C illustrate advantageous configurations for the diaphragm and the recess for various sensor structure shapes.
Figure 9B:
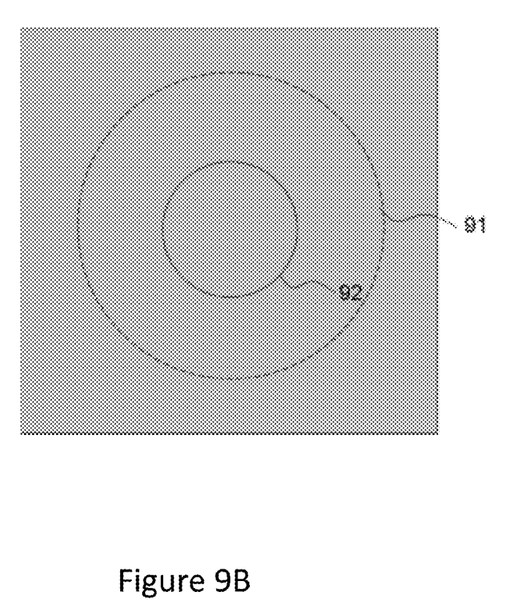
Figure 9C:
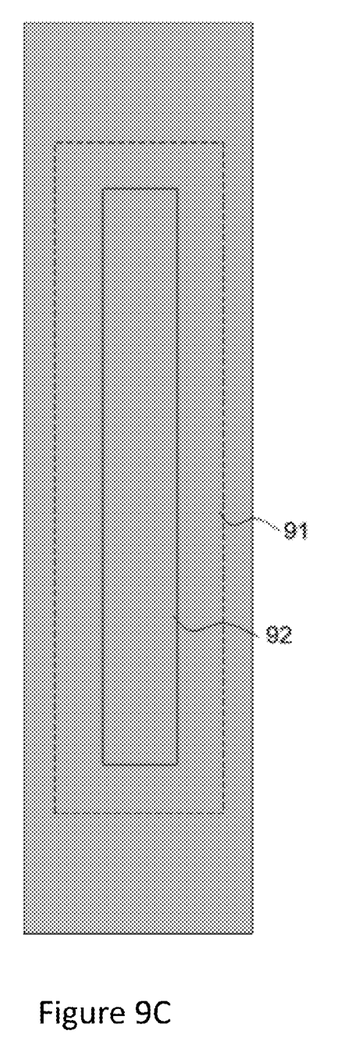

FIG. 9A illustrates an advantageous configuration for the periphery of the diaphragm 91 and the periphery of the recess 92 for a rotationally symmetrical square shaped sensor structure. FIG. 9B illustrates an advantageous configuration for the periphery of the diaphragm 91 and the periphery of the recess 92 for a rotationally symmetrical square shaped sensor structure with a circle shaped diaphragm. FIG. 9C illustrates an advantageous configuration for the periphery of the diaphragm 91 and the periphery of the recess 92 for an oblong sensor structure.

Figure 10:
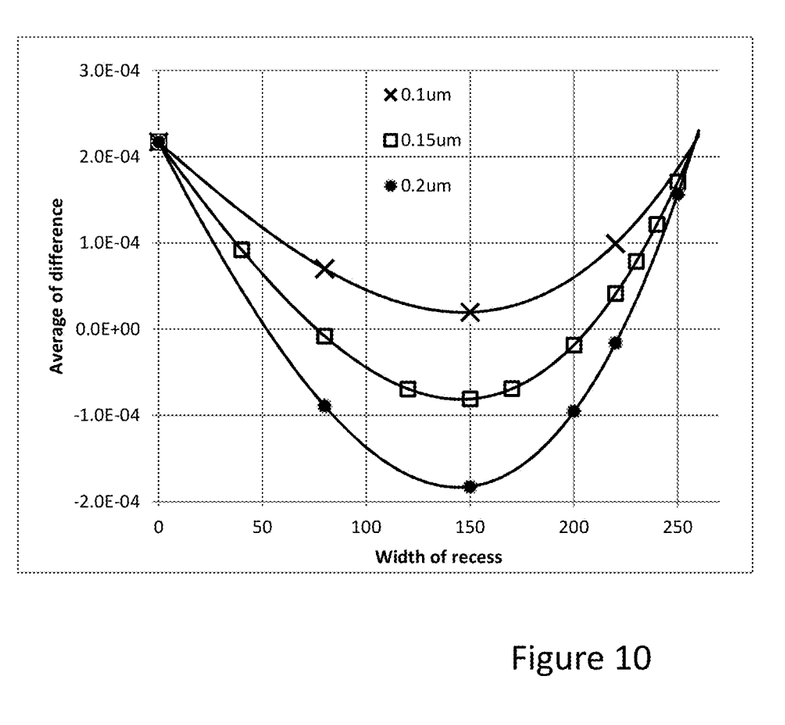
FIG. 10 illustrates dimensioning aspects of the embodiment of FIG. 8.

FIG. 10 illustrates some dimensioning aspects of the above embodiment. Referring back to FIG. 8, let us assume an exemplary diaphragm, where the width of the planar base 81 is 0.535 mm, and the length is at least three times said width. The width of the diaphragm 87 is 0.250 mm. The thickness of the diaphragm 87 is 5 µm, the thickness of the insulating side walls 83 is fpm and the thickness of the planar base 81 is 0.22 mm. The shape of the recess 88 follows the shape of the oblong diaphragm, and the center point of the recess coincides with the center point of the oblong diaphragm. FIG. 10 shows finite element method (FEM) simulations made with these exemplary dimensions for values of $\Delta H_{ave}$ of the equation (4), i.e. average of the difference of the bendings $\Delta H(x,y)$ over the extent the diaphragm for varying recess widths and for three recess depths. It is seen that the compensating effect begins already in areas beyond the diaphragm, i.e. where the periphery of the recess on the third surface is larger than the underlying periphery of the diaphragm. However, it has been detected that, as also seen in FIG. 10, that the compensation effect only begins when the width of the recess equals approximately the sum of the width of the diaphragm and twice the thickness of the diaphragm. FIG. 10 also shows that compensation effect is strongest when the width of the recess is in a range of 0.4 to 0.7 times the width of the diaphragm. In the exemplary configuration of FIG. 9, the maximum effect is achieved when the recess width is about 0.55 times the diaphragm width.

FIG. 10 also illustrates the effect of the depth of the recess to the compensation effect. It is easily understood that the counter-bending moment increases when the recess depth increases. FIG. 10 illustrates that recess configurations on the diaphragm plate may under- or over-compensate the bending of the underlying planar base wafer, and the extent of compensation may be controlled to zero the average difference with specific combinations of the recess width and the recess depth. Typically the ranges of recess widths with strongest compensation, as discussed above, are preferred. This is because a diaphragm shape that fully compensates the bending related error can then be achieved with a relatively shallow recess, which is easier to manufacture. Furthermore, as may be seen, curves of the deeper recesses are steeper, which means that shallow recess combinations are more sensitive to unintentional variations in the width.

Figure 11:
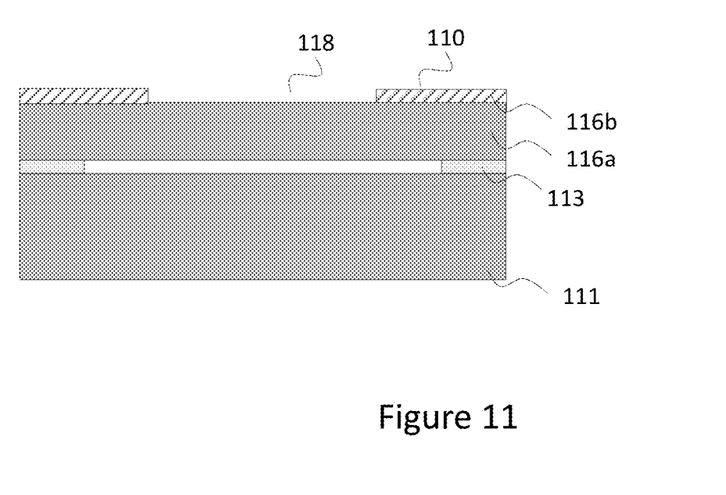
FIG. 11 illustrates an embodiment where the diaphragm plate is a dual layer structure.

In FIG. 10, the diaphragm plate is a monolayer structure into which the recess has been made by removing material of the diaphragm plate, e.g. by etching. FIG. 11 illustrates another embodiment where the diaphragm plate is a multi-layer structure, here a dual layer structure. FIG. 11 is a side view that shows the sensor structure from its width dimension, and shows the planar base 111, the side walls 113 and the diaphragm plate 116a/116b elements described in more detail above with FIG. 2. In this embodiment, the diaphragm plate comprises a bottom layer 116a that lies on the side walls 113, and a top layer 116b that is added on top of the lower layer to provide the third surface 110 of the diaphragm plate. This third surface 110 includes a periphery of at least one recess 118, a depth of which extends in the direction of the side walls. The nominal thickness of the diaphragm equals to the distance from the second surface to the outer surface of the diaphragm plate at the periphery of the diaphragm, and thus equals here the thickness of the diaphragm plate, i.e. the sum of thicknesses of the bottom layer 116a and the top layer 116b. The depth of the recess 88 is less than the nominal thickness of the diaphragm.

The layers of the multilayer diaphragm may be of same material, or they may be made of different materials. In FIG. 11 a layer of different material has been deposited on top of a plate to provide the recessed third surface and thereby the counter-bending moments at the edges of the recess when a bending moment is experienced at the periphery of the diaphragm. A multi-layer structure with different materials may be applied, for example, for easier manufacturing steps.

Figure 12:
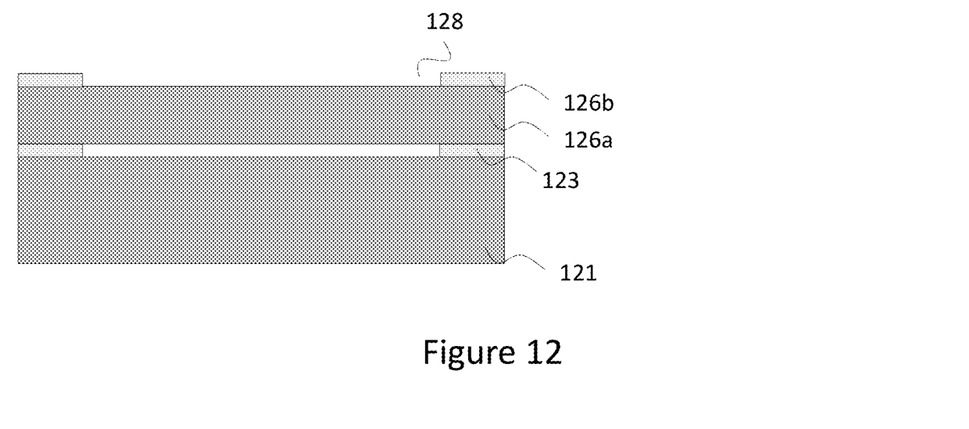
FIG. 12 illustrates an embodiment where the material of the top layer has been selected to further compensate differences in thermal expansion of elements in the sensor structure.

FIG. 12 illustrates a further embodiment where the material of the top layer has been selected to further compensate differences in thermal expansion of elements in the sensor structure. FIG. 12 is a side view that shows the sensor structure from its width dimension, and shows the planar base 121, the side walls 123 and the diaphragm plate 126a/126b elements described in more detail above with FIG. 2. Very often the planar base and the bottom layer 126a of the diaphragm plate are made of silicon, and the insulating side walls are made of silicon oxide. These materials have different thermal coefficients of expansion, and with changing temperatures, this difference may cause bending of the structures and a bending moment at the edge of the diaphragm. It has been detected that this effect can be alleviated or practically eliminated by adding on top of the bottom layer 126a of the diaphragm plate a recessed layer 126b of the same material that is used in the side walls 123. The planar outer region of the top layer 126b forms the third surface from which the recess 128 extends parallel to the side walls towards the gap. The nominal thickness of the diaphragm equals to the distance from the second surface to the outer surface of the diaphragm plate at the periphery of the diaphragm, and thus equals here the thickness of the bottom layer 126a of the diaphragm plate. The depth of the recess 128 is less than the nominal thickness of the diaphragm. Advantageously, but not necessarily, the periphery of the recess coincides with the periphery of the diaphragm.

Figure 13:
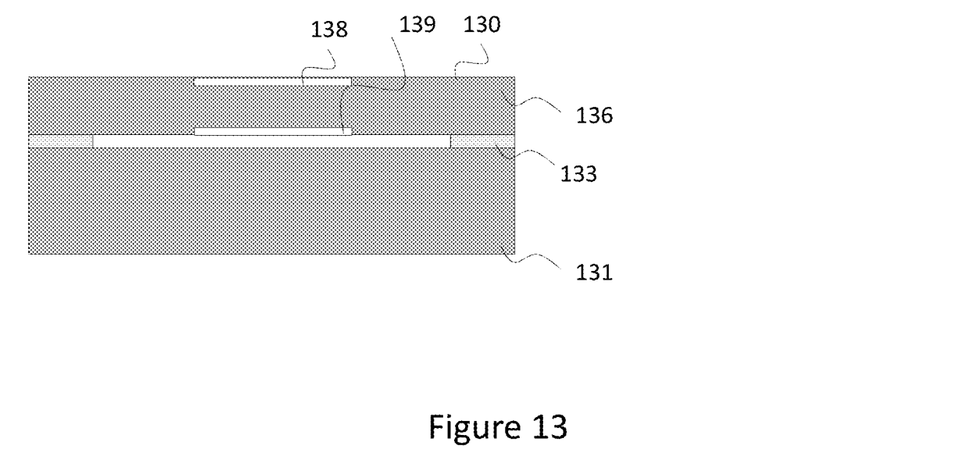
FIG. 13 illustrates an embodiment, where the bending shape of the diaphragm is manipulated locally to change its bending rigidity.

In the above embodiment local variations to the thickness of the diaphragm plate are made with a recess in its third surface. In such a case bending moments at the edges of the recess will dominate. FIG. 13 illustrates a further embodiment, where the bending shape of the diaphragm is manipulated locally to change its bending rigidity and thereby make the diaphragm to follow the bending shape of the planar base. FIG. 13 is a side view that shows the sensor structure from its width dimension, and shows the planar base 131, the side walls 133 and the diaphragm plate 136 elements described in more detail above with FIG. 2. In this embodiment, the diaphragm plate is again a monolayer structure whose top plane constitutes an outer surface of the diaphragm plate, and the third surface 130 of the diaphragm plate 136. The nominal thickness of the diaphragm equals to the distance from the second surface to the outer surface of the diaphragm plate at the periphery of the diaphragm, and thus equals here the thickness of the diaphragm plate. As earlier, the third surface 130 includes a periphery of at least one recess 138, a depth of which extends in the direction of the side walls. The depth of the recess 138 is less than the nominal thickness of the diaphragm. In addition, also the second surface includes at least one recess 139, the depth of which also extends in the direction of the side walls, but away from the gap. The depth of the recess 139 is also less than the nominal thickness of the diaphragm. With such a configuration, it is possible to create a situation where practically no bending moments at the edges of the recess are introduced, only a local decrease of the bending rigidity.

Figure 14:
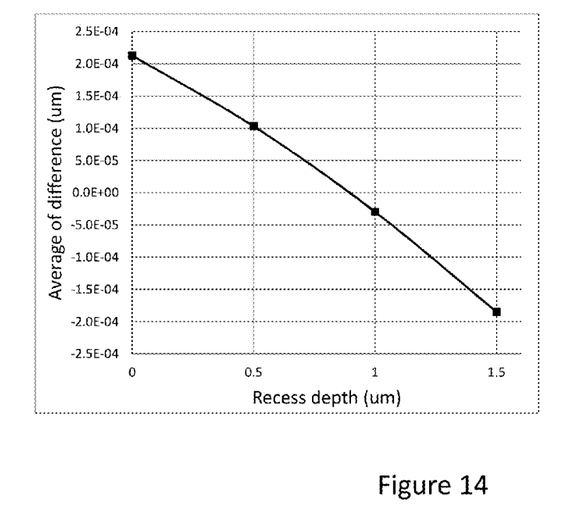
FIG. 14 average values of difference of the bendings over the extent of an exemplary diaphragm for varying recess depths of two identical and symmetrically positioned recesses.

In some cases it may be advantageous to use recesses that are identical in size and symmetrically positioned in either side of the diaphragm to compensate the difference in bending of the wafer and the diaphragm. Identical in size means here that the width, the length and the depth of the recesses are the same. Symmetrical positioning means here that a line between center points of the recesses coincides with the center point or center line of the diaphragm. As an example, FIG. 14 shows finite element method (FEM) simulations for values of average of the difference of the bendings $\Delta H(x,y)$ over the extent of an exemplary diaphragm for varying recess depths of two identical and symmetrically positioned recesses. It is seen that at some point, the difference can be made to go to zero.

The two recesses 138, 139 do not, however, need to be identical. For example, the local decrease in bending rigidity may with some configurations provide a better compensation against bending of the structures, and recess-induced counter-bending moment a better compensation against in-plane tension or compression. If the recess on the third surface is different from the recess in the second surface, both the counter-bending moment and the reduced bending rigidity may have an effect to the bending shape of the diaphragm. This means that by selecting specific depths for the two recesses, the sensor capacitance can be made totally insensitive to practically any combination of bending of the underlying structures and tensile/compressive in-plane stresses. The two recesses 138, 139 may thus differ by width or depth or both.

The two recesses 138, 139 do not need to be symmetrically positioned, either. The recesses may be located asymmetrically such that from a top view the recesses coincide but the distance from an edge of a recess to a closest edge of the diaphragm plate may be different in different positions of the recess periphery. Asymmetrical positioning of the recesses may be advantageous if the whole sensor is asymmetrical, i.e. the distance from an edge of the diaphragm to the closest edge of the sensor is different in different positions of the diaphragm periphery.

It is noted that the simulated examples above are exemplary dimensions with an exemplary oblong sensor structure. The disclosed recesses, their dimensions and positions are, however, not limited to these examples and their dimensions, but are within the scope of the claims applicable to capacitive pressure sensor structures of various sizes and shapes.

Figure 15:
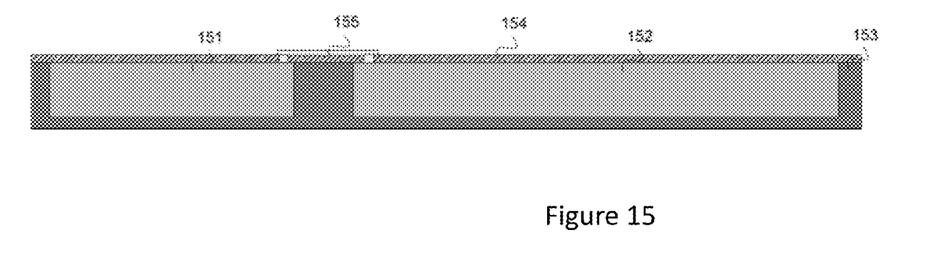
FIG. 15 illustrates an embodiment of a microelectromechanical pressure sensor.

FIG. 15 illustrates an embodiment of a microelectromechanical pressure sensor device 150. The pressure sensor device comprises a sensor structure 151 which may include any of the alternative sensor structures described above. The pressure sensor also comprises an electrical circuit part 152. The sensor structure 151 and the electrical circuit part 152 may be separate dies molded in plastic material 153. A polymer dielectric layer 154 may be deposited in the re-built wafer. Contacts to the electrical terminals 155 of the dies may be provided with deposited film layers through openings on the dielectric layer 154.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A microelectromechanical pressure sensor structure that comprises a planar base, side walls and a diaphragm plate, wherein
   the side walls extend as a circumference, a first distance away from the planar base;
   the diaphragm plate has a planar inner surface that extends on top of the side walls, and an outer surface opposite the inner surface on the diaphragm plate;
   the planar base, the side walls and the diaphragm plate are attached to each other;
   a top edge of inner surfaces of the side walls forms a periphery of a diaphragm, a nominal thickness of the diaphragm equals to the distance from the inner surface to the outer surface of the diaphragm plate at the periphery of the diaphragm;
   the outer surface of the diaphragm plate includes a planar surface part that includes a periphery of a recess, a depth of which extends parallel to the side walls and is less than the nominal thickness of the diaphragm.

2. A microelectromechanical pressure sensor structure of claim 1, wherein the planar base, the side walls and the diaphragm plate form a hermetically closed gap in a reference pressure.

3. A microelectromechanical pressure sensor structure of claim 1, wherein the inner surface and the outer surface are exposed to different pressures.

4. A microelectromechanical pressure sensor structure of claim 1, wherein the periphery of the diaphragm and the periphery of the recess have the same shape.

5. A microelectromechanical pressure sensor structure of claim 1, wherein the diaphragm has a length and a width in the plane of the inner surface, wherein the length is in a direction of the longest extent of the diaphragm, and the width is in a direction perpendicular to the direction of the length in the inner surface;
   a width of the recess on a planar surface part of the outer surface extends parallel to the direction of the width of the diaphragm;
   the width of the recess is equal to or less than the sum of the width of the diaphragm and two times the thickness of the diaphragm.

6. A microelectromechanical pressure sensor structure of claim 5, wherein the width of the recess is 0.4 to 0.7 times the width of the diaphragm.

7. A microelectromechanical pressure sensor structure of claim 1, wherein the diaphragm plate is a monolayer structure where the recess has been made by removing material from the outer surface of the monolayer structure.

8. A microelectromechanical pressure sensor structure of claim 1, wherein the diaphragm plate is a multi-layer structure that comprises a bottom layer that includes the inner surface, and a top layer over the bottom layer.

9. A microelectromechanical pressure sensor structure of claim 8, wherein a region of the top layer provides the planar surface part of the outer surface and the depth of the recess corresponds to the thickness of the top layer.

10. A microelectromechanical pressure sensor structure of claim 9, wherein the lower layer and the top layer are of the same material.

11. A microelectromechanical pressure sensor structure of claim 9, wherein the lower layer and the top layer are of different material.

12. A microelectromechanical pressure sensor structure of claim 10, wherein the top layer is of the same material as the side walls.

13. A microelectromechanical pressure sensor structure of claim 1, wherein the inner surface includes at least one recess, a depth of which extends away from the gap in the direction of the side walls.

14. A microelectromechanical pressure sensor structure of claim 13, wherein the recess in the planar surface part of the outer surface and the recess in the inner surface are identical.

15. A microelectromechanical pressure sensor structure of claim 13, wherein the recess in the planar surface part of the outer surface and the recess in the inner surface are symmetrically positioned in either side of the diaphragm.

16. A microelectromechanical pressure sensor structure of claim 13, wherein the recess in the planar surface part of the outer surface and the recess in the inner surface are asymmetrically positioned in the diaphragm.

17. A pressure sensor device that comprises An electrical circuit part and a pressure sensor structure of claim 1.

* * * * *